United States Patent

[11] 3,621,014

| [72] | Inventors | Ulrich Stache<br>Hofheim, Taunus;<br>Werner Haede, Hofheim, Taunus; Werner Fritsch, Neuenhain, Taunus; Kurt Radscheit, Kelkheim, Taunus; Hans-Georg Schroder, Hofheim, Taunus, all of Germany |
|---|---|---|
| [21] | Appl. No. | 791,185 |
| [22] | Filed | Jan. 14, 1969 |
| [45] | Patented | Nov. 16, 1971 |
| [73] | Assignee | Farbwerke Hoechst Aktiengesellschaft vormals Meister, Lucius & Bruning Frankfurt am Main, Germany |
| [32] | Priority | Jan. 18, 1968 |
| [33] | | Germany |
| [31] | | P 16 68 079.8 |

[54] 17α, 21-ORTHOCARBONATES OF STEROID DERIVATIVES
5 Claims, No Drawings

[52] U.S. Cl. ........................................... 260/239.55
                                                260/397.45
[51] Int. Cl. ........................................... C07c173/00
[50] Field of Search ............................... 260/239.55
                                                    D

[56]            References Cited
            UNITED STATES PATENTS
3,312,591   4/1967   Elks et al. ..................... 167/58

Primary Examiner—Elbert L. Roberts
Attorney—Curtis, Morris & Safford

ABSTRACT: The present invention relates to 17α,21-orthocarbonates of steroid derivatives.

17α, 21-ORTHOCARBONATES OF STEROID DERIVATIVES

DESCRIPTION OF THE INVENTION

It is already known that higher membered tetraalkyl-orthocarbonates (ortho-esters of carbonic acid) can be obtained according to Arbusow et al. (Doklady Acad. S.S.S.R. 68, (1949), page 515) by transesterification of lower tetraalkyl-orthocarbonates (for example, tetramethyl- and tetraethyl-orthocarbonates) with the corresponding higher alcohols (having chain lengths of from six C-atoms upwards). Transesterifications of tetraalkyl-orthocarbonates with hydroxyl groups of steroids have not been described as yet.

17α,21-dialkyl-orthocarbonates of 17α,21-dihydroxy-steroids of the general formula I

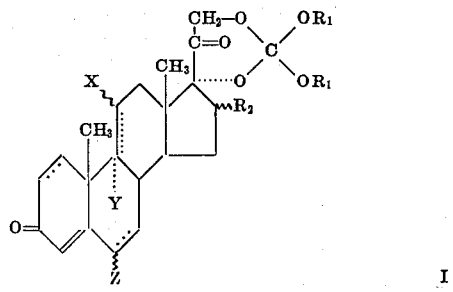

in which X represents one or two hydrogen atoms or the groups

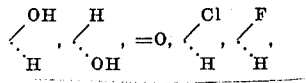

Y represents hydrogen or a halogen atom, Z represents hydrogen, fluorine, chlorine, bromine, methyl, ethyl, nitrile, formyl or hydroxymethyl, $R_1$ represents a lower alkyl group which is saturated or unsaturated singly or several times, and $R_2$ hydrogen or, in α- or β-position, methyl, ethyl, lower alkoxy, fluorine, chlorine, bromine, hydroxy or a methylene group that may be substituted by one or two fluorine atoms, and in which formula the steroid molecule may contain additional double bonds or oxido groups in the 1,2-, 6,7-, 9,11- and/or 11,12-positions, are obtained by reacting, in the presence of acid catalysts, 17α,21-dihydroxy-20-oxosteroids of the general formula II

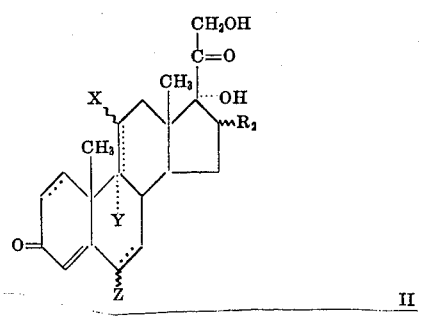

in which X, Y, Z, and $R_2$ have the meanings given above, with an orthocarbonate of the general formula III $$C(OR_1)_4 \quad III$$

in which $R_1$ has the meaning given above, and, if desired, introducing subsequently by dehydrogenation a double bond into the 1,2-and/or the 6,7-position.

In view of the cited reference in the literature, it was surprising that only two of the four equivalent alkoxy groups of the orthocarbonates used reacted very selectively, moreover with ring formation, with the nonequivalent hydroxyl groups in the 21- (primary alcohol group) and 17α-position (tertiary alcohol group) to effect transesterification.

It was rather to be expected that only the primary 21-hydroxy group of the steroid component, which is considerably more reactive towards the tertiary 17α-hydroxy group, would react with the four equivalent alkoxy groups of the orthocarbonates under formation of an analogous tetramer of the general formula

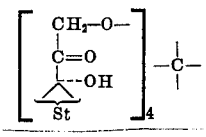

Very surprising is also the very smooth course of the transesterification of the orthocarbonates with the 17α,21-dihydroxy-steroids in view of the sterically large group in the 16α-position, for example the methyl group. Although, for example, the 16α-methyl group enters into a strong reciprocal steric activity with the 17α-hydroxy group, the 17α,21-orthocarbonates of the 16α-methyl-steroids are obtained under the same mild reaction conditions and with the same excellent yields (up to 90–100 percent the theory) as the products of the present invention without a corresponding group in the 16α-position.

The process according to the present invention proceeds, for example when using hydrocortisone, according to the following reaction scheme

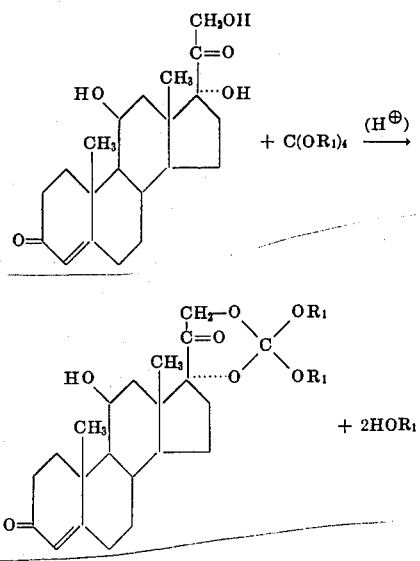

The 17α,21-dihydroxy-20-oxosteroids of the pregnane series required as the starting substances can be prepared according to generally known processes. As such compounds, there may be used, for example: cortisone, hydrocortisone, Reichstein's substance S, prednisone, prednisolone, 6α-methyl-prednisolone, 16α- or 16β-methyl-prednisolone, 9α-fluoro- or 9α-chloro- or 9α-bromo-prednisolone, 16-methylene-prednisolone, 6α,9α-difluoro-prednisolone, 6α-methyl-9α-fluoro-prednisolone, 6α-fluoro- or chloro-prednisolone, 9α-fluoro-16αmethyl-prednisolone, 9α-fluoro-16β-methyl-prednisolone, 9α-fluoro-16-methyl-prednisolone, 6α-fluoro-6β-methyl-prednisolone, 6α-fluoro-16-methyl-prednisolone, 6αfluoro-16-methylene-prednisolene, 6α, 9α-difluoro-16β-methyl-prednisolone, 6α, 9α-difluoro-16-methylene-prednisolone, 9α-fluoro-6α, 16α -dimethyl-prednisolone, 9α, 16α-difluoro-prednisolone, 6α, 9α, 16α-trifluoro-prednisolone, 17α, 21-dihydroxy- $\Delta^{4,(5),9(11)}$-pregnadiene-dione-(3,20), 17α, 21-dihydroxy-9β-11β-oxido-$\Delta^4$-pregnene- dione-(3,20),17α, 21-dihydroxy-9α, 11β-dichloro-$\Delta^{1,4}$-pregnadiene-dione-(3,20), 17α, 21-dihydroxy-$\Delta^{4(5),6(7)}$3,20).

As tetraalkyl-orthocarbonates may be used, for example: tetramethyl-, tetraethyl-, tetrapropyl-, tetrabutyl-, tetrapentyl- , tetrahexyl-, tetraheptyl-, tetraoctyl-, tetranonyl-, tetradecyl-orthocarbonate, tetraallyl- or tetraproparayl-orthocarbonate. The basic alcohols may be primary, secondary or tertiary alcohols.

The tetraalkyl-orthocarbonates can be prepared according to (1) Tieckelmann et al., J. Org. Chem. 13(1948), 266, (2) Conolly et al., J. Chem. Soc. (1937), 828 or (3) Arbusow et al., Doklady Acad. S.S.S.R. 63, (1949), 515.

The orthocarbonates which contain a longer chain or which are unsaturated are advantageously prepared by transesterification of tetramethyl-, tetraethyl- or tetrapropyl-orthocarbonates with the corresponding alcohols according to the method described in the literature cited under (3) or according to a modification thereof.

As acid catalysts, above all mineral or organic acids, for example sulfuric acid, p-toluene-sulfonic acid, hydrochloric acid, trifluoroacetic acid, formic acid, acetic acid or oxalic acid may be used for the reaction. Substances having an acid reaction, for example pyridine-hydrochloride, phosphoroxy chloride, boron-trifluoride etherate may also be used.

As solvents, for example ethers such as diethyl-ether, tetrahydrofurane, dioxane, gylcol-dimethyl-ether, or diethylene-glycol dimethyl-ether; hydrocarbons such as n-hexane, cyclohexane, benzene, toluene, or xylene; tertiary acid amides such as dimethylformamide or dimethyl-sulfoxide; halogenated hydrocarbons such as methylene chloride, chloroform or carbon tetrachloride; or carbon disulfide; or mixtures of these solvents may be used. The reaction, however, can also be effected without such solvents.

For carrying out the process, the $17\alpha$, 21-dihydroxy--20-oxosteroid compound is suspended or dissolved in one of the above-cited solvents, preferably in a solvent which is miscible with water, for example tetrahydrofurane, dioxane, dimethylformamide, or dimethyl-sulfoxide. Then 1–100 molar equivalents, preferably 2–10 molar equivalents, of the tetraalkyl-orthocarbonate and preferably 0.001 to 1 molar equivalent of a mineral or organic or mixed acid are added. The reaction mixture is stirred or allowed to stand at temperatures in the range of $-60°$ C. to the boiling temperature of the solvent used or of the orthocarbonate used, preferably at temperatures in the range of from $0°$ to $50°$ C. The reaction times are different, but in general they are between 3 minutes and 20 hours. The transesterification at temperatures in the range of from $0°$ to $50°$ C. generally proceeds so rapidly that a considerable part of the $17\alpha$, 21-orthocarbonate has already formed after 10 seconds. When the reaction is completed, the reaction mixture can be allowed to stand for an indefinite period of time (for example, up to 6 weeks), without the reaction products undergoing a noticeable further chemical modification. Even under longer periods of stay under the indicated reaction conditions, neither dehydration of a 11-hydroxy group when 11-hydroxy-steroids are used, nor a 3-enol-ether formation when 3-keto-$\Delta^4$-steroids are used, can be observed.

If desired, the alcohols formed during the transesterification can be continuously removed from the reaction mixture by fractional distillation, while simultaneously using one of the cited solvents to entrain water.

For isolating the products of the invention, the reaction mixture is poured, if the process has been carried out with solvents that are miscible with water, into water which contains an excess of base, for example bicarbonate or pyridine, for neutralization of the acid used. Generally, the products then precipitate in an already very pure crystalline form. Reaction products which are obtained in the form of an oil can be isolated in pure form by the generally known extraction processes. Further purification is effected by the usual recrystallization. If the reactions have been carried out at temperatures exceeding $50°$ C. and as a consequence undesired side-products have been formed or colorations have occurred, the products can also be subsequently isolated in pure form by chromatography. If solvents have been used that are not miscible with water, the products are preferably isolated by removing the solvent, after neutralization of the acid, by distillation and by recrystallizing or chromatographing the residual as usual. Depending on the reaction conditions selected, the yields amount to 20–100 percent of the theory; at reaction temperatures in the range of from $0°$ to $50°$ C., in most cases yields in the range of from 70 to 100 percent of the theory are obtained.

If desired, the products so obtained can be subsequently dehydrogenated in the usual manner in order to introduce a 1,2-and/or 6,7-double bond. Dehydrogenation is effected according to known processes, for example with selenium dioxide or quinones.

The products of the present invention possess valuable pharmacologic properties. The compounds derived from cortisone or cortisol are distinguished by an unexpectedly high and protracted anti-inflammatory action, especially upon local administration. Thus, for example, the $6\alpha$, $9\alpha$-difluoro-16-methyl-prednisolone-$17\alpha$21-diethyl-orthocarbonate has in the Granuloma-Pouch Test in female rats a notably stronger local anti-inflammatory action than the $6\alpha$, $9\alpha$-difluoro-$16\alpha$-methyl-prednisolone-$16\alpha$,$17\alpha$-acetonide which corresponds to this basic substance. The same applies to other products as has been shown by the following test:

Female Sprague-Dawley rats having in initial weight of between 150 and 200 g. were injected in the middle of the dorsal skin with 25 ml. of air and into this air bubble, 0.5 ml. of 1 percent croton oil were introduced. Forty-eight hours later the air was withdrawn and 72 hours later the adhesions formed were removed.

For testing the local activity, the substances dissolved in 0.2 ml. of sesame oil were daily injected directly into the skin pocket. On the eighth day after formation of the skin pocket, the animals were sacrificed and the volumes of the exudates that had accumulated in the pockets were determined. The quantity of exudates of the test group was collected and compared with the quantity obtained from the untreated control group. It is a measure of the strong anti-inflammatory action of the substances.

| | Dose (mg./animal) | 0.0005 | 0.002 | 0.01 |
|---|---|---|---|---|
| | Volume of exudate Control:7.6 ml. | | | |
| 1. | Dexamethasone-$17\alpha$, 21-diethyl-orthocarbonate | 1.9 ml. | 0.6 ml. | 0.3 ml. |
| 2. | $6\alpha$-Fluor-triamcinolone-$16\alpha$,$17\alpha$-acetonide (as comparison) | 3.0 ml. | 1.5 ml. | 0.5 ml. |
| | Dose (mg./animal) | 0.005 | 0.02 | 0.1 |
| | Volume of exudate Control 9 ml. | | | |
| 1. | $6\alpha$-Methyl-prednisolone-$17\alpha$, 21-diethyl-orthocarbonate | 2.2 ml. | 1.5 ml. | 0.8 ml. |
| 2. | $6\alpha$-Methyl-prednisolone-21-acetate (as comparison) | 6.2 ml. | 3.3 ml. | 1.4 ml. |

Thus, the compounds have, especially at lower concentrations, a considerably stronger local anti-inflammatory action than the known comparative substance. At the same time, the systemic effect and therewith also the risk of undesired side-reactions is minimized. This is shown by the following comparative test:

For testing the systemic action, the substances dissolved in 0.2 ml. of sesame oil were injected daily subcutaneously into mice that had been treated in the manner described:

| | Dose (mg./animal) | 0.005 | 0.02 | 0.1 |
|---|---|---|---|---|
| | Volume of exudate Control: 9 ml. | | | |
| 1. | $6\alpha$-Methyl-prednisolone-$17\alpha$, 21-diethyl-ortho-carbonate | 9.6 ml. | 5.9 ml. | 2.7 ml. |
| 2. | $6\alpha$-Methyl-prednisolone-21-acetate (Comparison) | 8.7 ml. | 4.7 ml. | 1.2 ml. |

The products derived from cortisone or cortisole thus have a very favorable dissociation quotient of local and systemic anti-inflammatory action. For this reason, they are especially suitable for topical and local application. The products can therefore be used in therapy, for example for the treatment of inflammatory dermatoses of various geneses, in the form of suspensions, ointments, creams, sprays, as well as, for example in the case of topical application, in the form of crystal suspensions, for example for intra-articular injection.

Furthermore, some of the products of the present invention, especially 11-desoxy-derivatives, for example those derived from Reichstein's substance S, exhibit diuretic and gestagenic action.

The products of the present invention may also be used as intermediate products for other chemically modified corticoids with valuable pharmaceutical properties. The products which contain a 17α,21-dihydroxy group blocked by an orthocarbonate structure have a much better solubility in organic hydrophobic solvents that are only sparingly soluble or practically not soluble in water, for example ethers such as tetrahydrofurane, isopropyl-ether, isobutyl-ether, or ethyl-ether, hydrocarbons such as benzene, toluene, xylene, cyclohexane, or n-hexane, carboxylic acid esters such as ethyl acetate or triethyl-orthoformic acid ester, and sesame oil, than the starting compounds. They can therefore be used in chemical reactions which proceed especially advantageously in such solvents, for example metalorganic reactions, an additional advantage being the good resistance of the 17α,21-dialkyl-orthocarbonates to alkaline reagents. If desired, the originally free 17α,21-dihydroxy structure may then be restored by a conventional solvolysis with acid catalysts.

The following examples illustrate the invention but they are not intended to limit it thereto. Unless stated otherwise, the infrared spectra in these examples were measured in KBr. The melting points were determined on a Kofler melting block and are not corrected.

EXAMPLE 1

Rrednisolone-17α,21-diethyl-orthocarbonate a. 1 g. of prednisolone was dissolved in 40 ml. of absolute tetrahydrofurane and 1 ml. of tetraethyl-orthocarbonate and 75 mg. of p-toluenesulfonic acid were added successively. The mixture was allowed to stand for 16 hours at 20° C., some drops of pyridine were added for neutralizing the acid and the solvent was removed by distillation under reduced pressure. The remaining clear oil crystallized upon trituration with ether. 740 mg. of crystalline prednisolone-17α,21-diethyl-orthocarbonate melting at 200°–202° C. were obtained.
Characteristic infrared bands: 3,420 (wide), 3,340 (shoulder), 1,725, 1,650, 1,605, 1,595, 1,200, 1,025 cm.$^{-1}$.

b. The same quantity of starting substances was used, but instead of tetrahydrofurane 40 ml. of absolute dioxane were used as solvent. The mixture was allowed to stand for 18 hours at 20° C., and was then poured into 200 ml. of water which contained an excess of sodium bicarbonate for neutralizing the acid, whereupon a white crystalline precipitate separated after some time. 970 mg. of white prednisolone-17α,20-diethyl-orthocarbonate melting at 200°–202° C. were thus obtained.
Characteristic infrared bands: as under (a).

c. Instead of dioxane, a corresponding amount of absolute dimethylformamide or of absolute dimethyl-sulfoxide was used as the solvent. After further treatment as under (b), the same reaction product was obtained.

EXAMPLE 2

Prednisolone-17α,21-bis-(n-propyl)-orthocarbonate 1.5 ml. of tetra-n-propyl-orthocarbonate and 75 mg. of p-toluene-sulfonic acid were added to a solution of 1 g. of prednisolone in 40 ml. of absolute dioxane. The whole was allowed to stand for 16 hours at 20° C., and then poured into a solution of sodium bicarbonate in water, whereupon a clear oil separated which crystallized after prolonged standing. (Yield: 985 mg.). After recrystallization from ether, the prednisolone-17α,21-bis-(n-propyl)-orthocarbonate showed a melting point of 158°–159° C. Characteristic infrared bands: 3,420–3,460 (wide), 1,725, 1,650, 1,610, 1,595, 1,195, 1,100–1,120, 1,025–1,035 cm.$^{-1}$.

EXAMPLE 3

Prednisolone-17α,21-dimethyl-orthocarbonate 400 mg. of prednisolone in 16 ml. of absolute dioxane were combined with 0.3 ml. of tetramethyl-orthocarbonate and 30 mg. of p-toluene-sulfonic acid. After 16 hours at 20° C., the reaction mixture was poured into a solution of sodium bicarbonate in water, whereupon a white crystalline precipitate separated. 335 mg. of prednisolone-17α,21-dimethyl-orthocarbonate were obtained. Melting point 194°–195° C.
Characteristic infrared bands: 3,495, 3,440 (shoulder), 1,720, 1,655, 1,615, 1,200, 1,120–1,135, 1,030 cm.$^{-1}$.

EXAMPLE 4

Cortisone-17α,21-diethyl-orthocarbonate a. 2.5 g. of tetraethyl-orthocarbonate and 225 mg. of p-toluene-sulfonic acid were added to a solution of 3 g. of cortisone in 120 ml. of absolute dioxane. After 15 hours standing at 20° C., the mixture was poured into 600 ml. of a solution of sodium bicarbonate in water; then, about 20 ml. of ethanol were added, whereupon a white crystalline product precipitated immediately. 2.82 g. of cortisone-17α,21-diethyl-orthocarbonate melting at 187°–188° C. were obtained. Melting point after recrystallization from ether: 188°–189° C.
Characteristic infrared bands: 1,730, 1,695, 1,650, 1,610, 1,200, 1,120, 1,020–1,030 cm.$^{-1}$ (no OH).

b. In an identical experiment, but with 3 minutes' standing only, there were obtained 610 mg. of the cortisone-diethyl-orthocarbonate from 500 mg. of cortisone.
Melting point: 188°–189° C.

c. and d. The same reaction product was obtained when using, instead of 225 mg. of p-toluene-sulfonic acid, 0.2 ml. of concentrated sulfuric acid or 0.5 g. of pyridine hydrochloride as acid catalysts.

EXAMPLE 5

Prednisone-17α,21-bis-(n-propyl)-orthocarbonate 0.5 ml. of tetra-n-propyl-orthocarbonate and 20 mg. of p-toluene-sulfonic acid were added to a solution of 200 mg. of prednisone in 8 ml. of absolute dioxane. After 3 hours' stirring at 20° C., the mixture was poured into a solution of sodium bicarbonate in water, whereupon a light oil separated. This oil was dissolved in methylene chloride. After washing with water, the solvent was removed by distillation under reduced pressure. The oil that remained behind (206 mg.) crystallized upon scratching with n-hexane. 164 mg. of prednisone-17α,21-bis-(n-propyl)-orthocarbonate melting at 117°–118° C. were obtained.
Characteristic infrared bands (as oil): 1,725, 1,700, 1,660, 1,620, 1,600, 1,200, 1,110, 1,030–1,050 cm.$^{-1}$ (no OH).

EXAMPLE 6

Cortisone-17α,21-bis-(n-propyl)-orthocarbonate 0.6 ml. of tetra-n-propyl-orthocarbonate and 40 mg. of p-toluene-sulfonic acid were added to a solution of 400 mg. of cortisone in 15 ml. of absolute dioxane. After standing for 1 hour at 20° C., the reaction mixture was poured into a solution of sodium bicarbonate in water, whereupon an oil precipitated which crystallized after some time. 464 mg. of cortisone-17α,21-bis-(n-propyl)-orthocarbonate melting at 116°–117° C. were obtained.
Characteristic infrared bands: 1,730, 1,695, 1,655, 1,610, 1,190, 1,125, 1,040 cm.$^{-1}$.

EXAMPLE 7

Cortisone-17α,21-bis-(n-butyl)-orthocarbonate 0.9 ml. of tetra-n-butyl-orthocarbonate and 40 mg. of p-toluene-sulfonic acid were added to a solution of 500 mg. of cortisone in 20 ml. of absolute dioxane. After standing for 15 hours at 20° C., the mixture was poured into a solution of sodium bicarbonate in water, whereupon an oil precipitated which crystallized after some time. 568 mg. of cortisone-17α,21-bis- (n-butyl)-orthocarbonate were obtained which was found to melt at 126° C. after recrystallization from a mixture of ether and n-hexane.

Characteristic infrared bands: 1,730, 1,700, 1,660, 1,610, 1,190, 1,120, 1,040–1,050 cm.$^{-1}$.

EXAMPLE 8

Prednisolone-17α,21-bis-(n-butyl)-orthocarbonate 0.9 ml. of tetra-n-butyl-orthocarbonate and 40 mg. of p-toluene-sulfonic acid were added to a solution of 500 mg. of prednisolone in 20 ml. of absolute dioxane. The whole was allowed to stand for 16 hours at 20° C. and then poured into a solution of sodium bicarbonate in water, whereupon a clear oil separated which soon crystallized. 507 mg. of prednisolone-17α,21-bis-(n-butyl)-orthocarbonate were obtained. After recrystallization from a mixture of ether and n-hexane, the compound was found to melt at 140°–141° C.

Characteristic infrared bands: 3,530, 3,430 (shoulder), 1,725, 1,655, 1,610, 1,105–1,130, 1,020–1,040 cm.$^{-1}$.

EXAMPLE 9

Prednisolone-17α,21-bis-(n-propyl)-orthocarbonate a. 0.75 ml. of tetra-n-propyl-orthocarbonate and 40 mg. of p-toluene-sulfonic acid were added to a solution of 500 mg. of prednisolone in 40 ml. of absolute dioxane. Then, about 20 ml. of dioxane were slowly distilled off in order to remove propyl alcohol, formed during the reaction, from the reaction mixture. After cooling to 20° C., the remaining reaction solution was poured into a solution of sodium bicarbonate in water, whereupon an oil separated which crystallized slowly. After the usual isolation and recrystallization from ether, prednisolone-17α,21-bis-(n-propyl)-orthocarbonate showing the same values as those indicated in example 2 was obtained.

b. The same product was obtained when boiling the reaction mixture under reflux for 10 minutes without submitting it to distillation and then pouring it into a mixture of pyridine and water.

EXAMPLE 10 a. 0.4 ml. of tetraethyl-orthocarbonate and 20 mg. of p-toluene-sulfonic acid were added to a solution of 200 mg. of 6αmethyl-9α-fluoro-prednisolone in 10 ml. of absolute dioxane. The mixture was allowed to stand for 30 minutes at 20° C. and then poured into a solution of sodium bicarbonate in water, whereupon a white crystalline product precipitated immediately. After filtration, the crystalline product was washed with water and dried. 212 mg. of 6α-methyl-9α-fluoro-prednisolone-17α,21diethyl-orthocarbonate in the form of fine white crystals melting at 196°–197° C. were obtained.

Characteristic infrared bands: 3,560 (pointed), 3,430 (wide), 1,720, 1,655, 1,605–1,620, 1,195, 1,120, 1,030 cm.$^{-1}$.

b. 375 mg. of 6α-methyl-9α-fluoro-prednisolone were dissolved in 2 ml. of absolute dimethylformamide and combined with 1.5 ml. of tetraethyl-orthocarbonate and 1.5 mg. of p-toluene-sulfonic acid. The reaction mixture was heated under an atmosphere of nitrogen for 4 hours to 120°–130° C., whereby the ethyl alcohol that had formed was distilled off. Some drops of pyridine were added to the light brown reaction solution and the solvents were removed by distillation in a high vacuum. A brown oil remained behind which was chromatographed on aluminum oxide Woelm, neutral, activity degree II (column: height = 8 cm., Φ = 2 cm.). The mixture was poured with methylene chloride onto the aluminum oxide and then elution was effected at first with benzene (3 fractions of 100 ml. each = fractions 1–3) and then with methylene chloride (15 fractions of 100 ml. each = fractions 4–18). Fractions 3–8 were combined and yielded, after removal of the solvent by distillation and recrystallization from a mixture of methylene chloride and ether, the product described under (a).

EXAMPLE 11

Dexamethasone-17α,21-dimethyl-orthocarbonate 0.25 ml. of tetramethyl-orthocarbonate and 23 mg. of p-toluene-sulfonic acid were added to a solution of 300 mg. of dexamethasone in 12 ml. of absolute dioxane. The mixture was allowed to stand for 16 hours at 20° C. and then poured into a solution of sodium bicarbonate in water, whereupon an oil precipitated which soon crystallized. 260 mg. of dexamethansone-17α,21-dimethyl-orthocarbonate were obtained.

Characteristic infrared bands: 3,420, 1,720, 1,650, 1,610, 1,200, 1,160, 1,110, 1,030 cm.$^{-1}$.

Melting point: 208°–210° C. (from ether).

EXAMPLE 12

Dexamethasone-17α,21-diethyl-orthocarbonate a. 400 mg. of dexamethasone in 20 ml. of absolute dioxane, 1 ml. of tetraethyl-orthocarbonate and 25 mg. of p-toluene-sulfonic acid were reacted in the manner described in example 11 and worked up. 376 mg. of dexamethasone-17α,21-diethyl-orthocarbonate melting at 248° C. were obtained.

Characteristic infrared bands: 3,430, 1,725, 1,655, 1,610, 1,200, 1,130, 1,020 cm.$^{-1}$.

b. 400 mg. of dexamethasone were reacted in a manner analogous to that described under (a). After addition of the acid, however, the reaction mixture was poured, after standing for only 3 minutes at 20° C., into a solution of sodium bicarbonate in water, whereafter the reaction product described under (a) was obtained after the usual isolation (yield 445 mg.).

EXAMPLE 13

Dexamethasone-17α,21-bis-(n-propyl)-orthocarbonate

A solution of 400 mg. of dexamethasone in 20 ml. of absolute dioxane was combined with 1.25 ml. of tetra-n-propyl-orthocarbonate and 25 mg. of p-toluene-sulfonic acid and allowed to stand for 4½ hours at 20° C. The reaction mixture was then poured into a solution of sodium bicarbonate in water, whereupon a light oil separated which became viscous after standing for 20 hours. The oil was dissolved in methylene chloride. After washing with water, the solvent was distilled off. From the oil that remained behind there were obtained with ether-n-hexane n-hexane 395 mg. of crystalline dexamethasone-17α,21-bis-(n-propyl)-orthocarbonate melting at 150° C. (sintering). Characteristic infrared bands (measured as oil): 3,440, 1,725, 1,655, 1,610, 1,195, 1,110, 1,035 cm.$^{-1}$.

EXAMPLE 14

6α,9α-Difluoro-16α-methyl-prednisolone-17α,21-diethyl-orthocarbonate 0.75 ml. of tetraethyl-orthocarbonate and 20 mg. of p-toluene-sulfonic acid were added to a solution of 300 mg. of 6α,9α-di-fluoro-16α-methyl-prednisolone in 15 ml. of absolute dioxane. The reaction mixture was allowed to stand for 3 hours at 20° C. and poured into a solution of sodium bicarbonate in water, whereupon a white crystalline precipitate separated immediately. 325 mg. of 6α,9α-difluoro-16α-methyl-prednisolone-17α,21-diethyl-orthocarbonate melting at 265°–266° C. were obtained.

Characteristic infrared bands: 3,340–3,440 (wide), 1,725, 1,660, 1,610, 1,200, 1,125, 1,020, 1,040 cm.$^{-1}$.

EXAMPLE 15

100 mg. of 6α,9α-difluoro-16α-methyl-prednisolone were dissolved in each of three 15 ml. portions of absolute dioxane, combined with 10 mg. each of p-toluene-sulfonic acid and then with (a) 0.15 ml. of tetramethyl-orthocarbonate, (b) 0.2 ml. of tetra-n-propyl-orthocarbonate, (c) 0.25 ml. of tetra-n-butyl-orthocarbonate.

The three reaction mixtures were allowed to stand for 3 hours at 20° C. and then poured into solutions of sodium bicarbonate in water, whereupon in cases (a) and (b) crystals precipitated soon which where filtered off and further treated as described in example 14.

In the case (a), 6α,9α-difluoro-methyl-prednisolone-17α,21-dimethyl-orthocarbonate melting at 272°–274° C. was obtained.

Characteristic infrared bands: 3,470, 1,725, 1,660, 1,620, 1,205, 1,170, 1,120, 1,050, 1,020 cm.[7E-1].

In the case (b), 6α,9α-difluoro-16αmethyl-prednisolone-17α,21-bis-(n-propyl)-orthocarbonate melting at 254°–256° C. was obtained.

Characteristic infrared bands: 3,490, 1,730, 1,660, 1,625, 1,195, 1,120, 1,045 cm.[7E-1].

The oily reaction product obtained in case (c) was worked up as described in example 13. 6α,9α-Difluoro-16α-methyl-prednisolone-17α,21-bis-(n-butyl)-orthocarbonate was obtained.

Characteristic infrared bands: (measured as oil): 3,470, 1,725, 1,660, 1,620, 1,250, 1,190, 1,130, 1,050, 1,015 cm.[7E-1].

EXAMPLE 16

Δ[4]-Pregnene-3,20-dione-17α,21-bis-(n-butyl)-orthocarbonate 200 mg. of Reichstein's substance S(17α,21-dihydroxy-Δ[4]-pregnene-3,20-dione) were suspended in 10 ml. of absolute benzene and dissolved by the addition of 10 ml. of absolute dioxane. After addition of 0.5 ml. of tetra-n-butyl-orthocarbonate and 13 mg. of p-toluene-sulfonic acid, the mixture was allowed to stand overnight (16 hours) at EXAMPLE C. Then, some drops of pyridine were added and the solvents were removed by distillation under reduced pressure. The residue was dissolved in methylene chloride, washed with water and the solvent was distilled off. The oily reaction product crystallized from ether. 210 mg. of Δ[4]-pregnene-3,20-dione-17α,21-bis-(n-butyl)-orthocarbonate melting at 130° C. were obtained.

Characteristic infrared bands: 1,725, 1,670, 1,610, 1,190–1,230 (several bands), 1,105, 1,030 cm.[7E-1].

EXAMPLE 17

17α,21bis-(n-propyl)-orthocarbonate of Reichstein's substance S 1.3 ml. of tetra-n-propyl-orthocarbonate and 80 mg. of p-toluene-sulfonic acid were added to a solution of 1 g. of Reichstein's substance S in 40 ml. of absolute dioxane. After 5 hours' standing at 20° C., the mixture was poured into a solution of sodium bicarbonate in water, whereupon a crystalline precipitate separated after some time. (1.22 g.). After recrystallization from a mixture of ether and n-hexane, the 17α,21-bis-n-propyl-orthocarbonate of Reichstein's substance S was obtained.

Melting point: 134°–136° C.

Characteristic infrared spectrum: 1,725, 1,670, 1,610, 1,190–1,230 (several bands), 1,105, 1,030 cm.[7E-1].

EXAMPLE 18

6α-Methyl-prednisolone-17α,21-diethyl-orthocarbonate 5 ml. of tetraethyl-orthocarbonate and 400 mg. of p-toluene-sulfonic acid were added to a solution of 5 g. of 6α-methyl-prednisolone in 200 ml. of absolute dioxane. The whole was allowed to stand for 4 hours at 20° C. and the mixture was then poured into 1,500 ml. of a solution of sodium bicarbonate in water. The precipitate that had separated was filtered off, washed with water and dried. 5.9 g. of crude 6α-methyl-prednisolone17α,21-diethyl-orthocarbonate were obtained; the compound was found to melt, after recrystallization from a mixture of methylene chloride and ether, at 168° C. Characteristic infrared bands: 3,585, 3,400, 3,220 (weak), 1,720, 1,650, 1,605, 1,230, 1,195, 1,115, 1,020 cm.[7E-1].

EXAMPLE 19

6αMethyl-prednisolone-17α,21-bis-(n-propyl)-orthocarbonate 5 g. of 6α-methyl-prednisolone and 6 ml. of tetra-n-propyl-orthocarbonate were reacted and worded up in the manner described in example 18. 5.7 g. of cride 6α-methyl-prednisolone-17α,21-bis-(n-propyl)-orthocarbonate were obtained.

Characteristic infrared bands: 3,570 2,415 (wide shoulder), 1,720, 1,650, 1,610, 1,200, 1,110, 1,025 cm.[7E-1].

EXAMPLE 20

α-Fluoro-prednisolone-17α,21diethyl-orthocarbonate 0.75 ml. of tetraethyl-orthocarbonate and 20 mg. of p-toluene-sulfonic acid were added to a solution of 300 mg. of 6α-fluoro-prednisolone in 15 ml. of absolute dioxane. The reaction mixture was allowed to stand for 4 hours at 20° C. and then poured into 150 ml. of a solution of sodium bicarbonate in water and then extracted with methylene chloride. After removal of the extraction agent by distillation, 360 mg. of residue were obtained which crystallized from a mixture of ether and petroleum ether. 276 mg. of 6α-fluoro-prednisolone-17α,21-diethyl-orthocarbonate were obtained; after recrystallization from a mixture of methylene chloride and ether, the compound was found to melt at 120°–121°C.

Characteristic infrared bands: 3,430 (wide), 1,725, 1,660, 1,620, 1,200, 1,130, 1,030 cm.[7E-1].

EXAMPLE 21

6α-Fluoro-prednisolone-17α,21-bis-(n-propyl)-orthocarbonate 300 mg. of 6α-fluoro-prednisolone and 0.8 ml. of tetra-n-propyl-orthocarbonate were reacted and worked up as described in example 20. 237 mg. of crystalline 6α-fluoro-prednisolone-17α,21-bis-(n-propyl-orthocarbonate melting at 200°C. were obtained.

Characteristic infrared bands: 3,420 (wide), 1,725, 1,660, 1,620, 1,200, 1,130, 1,110, 1,045 cm.[7E-1].

We claim:

1. Asteroid 17α,21-orthocarbonate of the formula

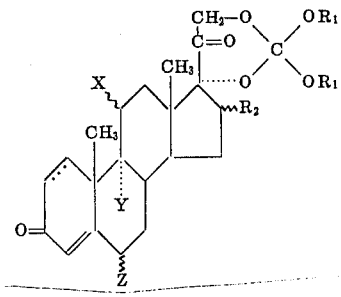

saturated or unsaturated in the 1,2-position, wherein X is hydrogen,

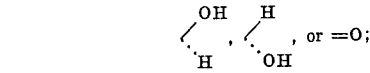

Y is hydrogen or fluorine; Z is hydrogen, fluorine, or methyl; $R_1$ is lower alkyl having up to four carbon atoms; and $R_2$ is hydrogen or methyl.

2. 6α,9α-difluoro-16α-methyl-prednisolone-17α,21-diethyl-orthocarbonate.

3. 6α,9α-Difluoro-16α-methyl-prednisolone-17α,21-dimethyl-orthocarbonate.

4. 6α,9α-Difluoro-16α-methyl-prednisolone-17α,21-bis-(n-propyl)-orthocarbonate.

5. 6α,9α-Difluoro-16α-methyl-prednisolone-17α,21-bis-(n-butyl)-orthocarbonate.

* * * * *